US012785975B2

(12) United States Patent
(10) Patent No.: US 12,785,975 B2
(45) **Date of Patent: *Nov. 3, 2026**

Dange et al.

(54) SYSTEM AND METHOD FOR PRIVACY-PRESERVING EVENT ATTENDANCE RECORDING

(71) Applicant: Amod Ashok Dange, Mountain View, CA (US)

(72) Inventors: Amod Ashok Dange, Mountain View, CA (US); Yash Mody, Mumbai (IN)

(73) Assignee: Amod Ashok Dange, Mountain View, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 19/050,154

(22) Filed: Feb. 11, 2025

(65) Prior Publication Data

US 2025/0184149 A1 Jun. 5, 2025

Related U.S. Application Data

(63) Continuation-in-part of application No. 18/783,017, filed on Jul. 24, 2024, which is a continuation-in-part (Continued)

(51) Int. Cl.
*H04L 9/32* (2006.01)
*G06F 21/32* (2013.01)

(Continued)

(52) U.S. Cl.
CPC ............ *H04L 9/3231* (2013.01); *G06F 21/32* (2013.01); *G06F 21/6245* (2013.01);

(Continued)

(58) Field of Classification Search
CPC ... G06F 21/6245; G06F 21/32; H04L 9/0866; H04L 9/3213; H04L 9/3231;

(Continued)

(56) References Cited

U.S. PATENT DOCUMENTS 6,401,206 B1 * 6/2002 Khan .................... H04L 9/3247 713/176
7,013,290 B2 3/2006 Ananian (Continued)

FOREIGN PATENT DOCUMENTS

JP 2014127164 A 7/2014

OTHER PUBLICATIONS

Sy et al. "Generation of Cryptographic Keys from Personal Biometrics: An Illustration Based on Fingerprints." dated Nov. 28, 2012, pp. 1-35.

(Continued)

*Primary Examiner* — Cheng-Feng Huang

(57) ABSTRACT

A system and method for privacy-preserving event attendance recording is disclosed. The system comprises steps of registering users using biometric samples to compute a Secret-Key (S1), generating a Unique-Number (N1), and applying a Function (F1) to compute a Public-Key (P1). The system further comprises steps of storing the Unique-Number (N1) on a user device and in a data repository, and Public-Key (P1) in a people registry as a base identifier. For event registration, users are authenticated by capturing a real-time biometric sample to generate the Secret-Key (S2), fetching Public-Key (P1), computing a Real-Time-Unique-Number (N2) using Public-Key (P1), Secret-Key (S2), and Function (F1), and comparing the Real-Time-Unique-Number (N2) with the Unique-Number (N1). Upon authentication, users register as supervisor or participant. Attendance is recorded by re-authenticating users and providing an Attendance-Recording-Interface.

17 Claims, 9 Drawing Sheets

Related U.S. Application Data of application No. 17/481,468, filed on Sep. 22, 2021, now Pat. No. 12,072,963, which is a continuation-in-part of application No. 17/018,273, filed on Sep. 11, 2020, now Pat. No. 11,582,032.

(60) Provisional application No. 63/029,717, filed on May 26, 2020, provisional application No. 62/954,591, filed on Dec. 29, 2019, provisional application No. 62/906,080, filed on Sep. 25, 2019.

(51) Int. Cl.
*G06F 21/62* (2013.01)
*H04L 9/08* (2006.01)
*H04L 9/40* (2022.01)

(52) U.S. Cl.
CPC .......... *H04L 9/0825* (2013.01); *H04L 9/0866* (2013.01); *H04L 9/0869* (2013.01); *H04L 9/3213* (2013.01); *H04L 9/3247* (2013.01); *H04L 63/0823* (2013.01); *H04L 63/0861* (2013.01); *H04L 63/102* (2013.01)

(58) Field of Classification Search
CPC ............... H04L 9/3247; H04L 63/0823; H04L 63/0861; H04L 63/102; H04L 9/0825; H04L 9/0869
See application file for complete search history.

(56) References Cited

U.S. PATENT DOCUMENTS 7,039,805 B1* 5/2006 Messing ................. G06F 21/32 713/176
7,093,131 B1* 8/2006 Kobayashi ............ H04L 9/3247 380/258
7,340,438 B2 3/2008 Nordman et al.
7,496,191 B1 2/2009 Crews et al.
7,769,633 B2 8/2010 Jokinen et al.
8,170,615 B2 5/2012 Vanska et al.
9,633,269 B2 4/2017 Gu et al.
10,136,191 B1 11/2018 Lewis et al.
10,489,826 B2 11/2019 Matthews et al.
10,530,577 B1 1/2020 Pazhoor et al.
11,252,479 B2 2/2022 Lewis et al.
2003/0028451 A1* 2/2003 Ananian ............... H04L 63/102 705/26.42
2003/0135740 A1* 7/2003 Talmor .................. H04L 9/3231 713/186
2006/0085844 A1* 4/2006 Buer ..................... H04L 9/3263 726/4
2007/0271463 A1* 11/2007 Ginter ................... G06F 21/109 713/176
2008/0072068 A1 3/2008 Wang et al.
2009/0271634 A1 10/2009 Boult et al.
2012/0033807 A1* 2/2012 Asim .................... G06F 21/606 380/44
2014/0006290 A1* 1/2014 Hozanne ............... H04L 9/3231 705/75
2015/0006895 A1* 1/2015 Irvine ................. G06F 21/6209 713/171
2015/0046699 A1* 2/2015 Benteo .................... G06F 21/35 713/155
2015/0095999 A1* 4/2015 Toth ...................... H04L 9/3263 726/6
2015/0134552 A1* 5/2015 Engels ................. G06Q 10/087 705/318
2015/0269389 A1* 9/2015 Lee ..................... H04L 63/0428 726/5
2015/0280921 A1* 10/2015 Geoffrey ............... H04L 9/3247 713/176
2016/0050213 A1* 2/2016 Storr ......................... H04L 9/32 726/6
2016/0219046 A1 7/2016 Ballard et al.
2017/0141920 A1* 5/2017 Herder, III ................ H04L 9/30
2017/0372059 A1 12/2017 Sindia et al.
2018/0173871 A1* 6/2018 Toth .................... H04W 12/126
2018/0307859 A1 10/2018 LaFever et al.
2019/0097812 A1* 3/2019 Toth ...................... H04L 9/0841
2019/0182176 A1 6/2019 Niewczas
2019/0306151 A1 10/2019 Hamel et al.
2020/0204545 A1 6/2020 Pacella et al.
2020/0266989 A1 8/2020 KrcMaricic-Barackov et al.
2020/0296093 A1 9/2020 Hoyos
2021/0058246 A1* 2/2021 Stolbikov ............. H04L 9/0841
2021/0091937 A1 3/2021 Dange et al.
2022/0004613 A1 1/2022 Dange et al.
2022/0004619 A1 1/2022 Dange et al.
2022/0004661 A1 1/2022 Dange et al.
2022/0006815 A1 1/2022 Dange et al.

OTHER PUBLICATIONS

Hochrieser, "Online Dating Can Benefit From Identity Verification and Biometric Authentication in 2019", Information Security Buzz, dated Jul. 18, 2019 pp. 1-5.
Arsenova, "Face Liveness Detection for Safe Biometric Authentication and Face Recognition", dated Jan. 27, 2020, pp. 1-10.
M. Kapko et al., "What is Windows Hello? Microsoft's biometrics security system explained" dated Jan. 12, 2021, pp. 1-5.
Mjaaland et al., "Biocryptics: Towards Robust Biometric Public/Private Key Generation", The Norwegian Information Security Conference (NISK) dated 2009, pp. 27-42.
Chandra et al., "Generate an Encryption Key by using Biometric Cryptosystems to secure transferring of Data over a Network", IOSR Journal of Computer Engineering (IOSR-JCE), vol. 12, Issue 1, dated May-Jun. 2013), pp. 1-11.

* cited by examiner

SYSTEM AND METHOD FOR PRIVACY-PRESERVING EVENT ATTENDANCE RECORDING

CROSS-REFERENCE TO RELATED APPLICATIONS AND PRIORITY

The present application is a Continuation in Part (CIP) application of U.S. Complete application Ser. No. 18/783,017, filed on Jul. 24, 2024 entitled "System and method for managing tokenized Personally-Identifiable-Information", which claims priority from and is a CIP of U.S. Complete application Ser. No. 17/481,468, filed on Sep. 22, 2021 entitled "System and method for affixing a signature using biometric authentication", which claims priority from and is a CIP of US Complete application Ser. No. 17/018,273 filed on Sep. 11, 2020 entitled "System and method for sharing user preferences without having the user reveal their identity", which claims the benefit of U.S. Provisional Application No. 62/906,080 filed on Sep. 25, 2019 entitled "Method and system of managing personal and business information", the U.S. Provisional Application No. 62/954,591 filed on Dec. 29, 2019 entitled "Method and system for anonymously matching consumers and businesses", and also from U.S. Provisional Application No. 63/029,717 filed on May 26, 2020 entitled "Method and system of storing identity and signature using the human body as a node."

TECHNICAL FIELD

The present subject matter described herein, in general, relates to a system and a method for privacy-preserving event management. More specifically, the present subject matter discloses a system and method for registering users, recording event attendance, assigning and managing tasks, and conducting performance analysis for events, while preserving user privacy and identity.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Traditionally, software applications require users to provide their identity and personal information to receive personalized services, including event management and attendance tracking. This practice has resulted in several undesirable outcomes, particularly in the context of event management and attendance recording.

In existing event management systems, users often create multiple profiles across various platforms, leading to difficulties in profile management and an increased risk of fake identities. An estimated 30% of profiles on social media are based on fake identities, which poses a significant challenge for reliable event attendance tracking. Moreover, current event management platforms often lack robust mechanisms to prevent users from creating profiles that correspond to someone other than themselves.

Event management applications frequently collect more personal information from users than necessary for their core functionality. This excess data collection not only raises privacy concerns but also creates potential for misuse, such as unauthorized targeted advertising, or worse, security concerns for public figures. Users often lack control over their own activity data once captured by these platforms, exacerbating privacy issues.

Existing solutions like Single Sign-On mechanisms (e.g., OAUTH and SAML) and two-factor authentication have attempted to address some of these issues. However, these solutions often reintroduce vulnerabilities during the authentication handoff or rely on Personally-Identifiable-Information, compromising user privacy. Current systems for storing user identities on network servers pose additional challenges, requiring significant resources for hosting, security, and maintenance.

In the context of event management and attendance tracking, these issues are particularly pronounced. There is a critical need for a system that can authenticate users, record attendance, manage tasks, and analyze performance without compromising individual privacy or security.

The event management and attendance recording field faces several specific challenges:

1. Authenticating the identities of event participants securely and reliably.
2. Maintaining the privacy and confidentiality of event participants throughout the process.
3. Authenticating the identities of all event participant roles with the same level of security and reliability.
4. Ensuring accurate attendance records.
5. Maintaining a comprehensive audit trail of event hosts' performance of their duties.
6. Creating and maintaining an audit trail of event attendees' acknowledgment, approval, or assessment of event hosts' task performance.
7. Maintaining a detailed audit trail of event attendees' performance of their assigned tasks.
8. Establishing an audit trail of event hosts' acknowledgment, approval, or assessment of event attendees' task performance.
9. Performing individualized analyses of attendee performance at events while offering flexibility in keeping the identities of attendees anonymous, pseudonymous, or named as required.
10. Conducting aggregated analyses of attendee performance at events with the same identity protection options.
11. Carrying out individualized analyses of host performance at events, with the ability to keep the identities of hosts anonymous, pseudonymous, or named based on specific needs.
12. Performing aggregated analyses of host performance at events, maintaining the same identity protection options for hosts.

These challenges highlight the complexity of creating a system that balances the needs for accurate event management, detailed performance tracking, and robust privacy protection. Current systems struggle to provide detailed performance insights while simultaneously offering options for keeping identities protected at various levels.

The ability to conduct nuanced analyses of both attendee and host performance, while maintaining flexible levels of identity protection, is particularly crucial. This extends to both the granular assessment of individual performance and the broader evaluation of collective performance trends, all while ensuring that the system can adapt to varying levels of identity disclosure as required for different types of events or reporting needs.

Furthermore, the system must be capable of maintaining detailed audit trails of all event-related activities while keeping participant identities secure. This includes tracking task assignments, completions, and mutual assessments between hosts and attendees, all without compromising the privacy of the individuals involved.

Thus, there is a long-felt need for a comprehensive system that can manage user profiles, preferences, and event-related activities without revealing user identities. Such a system must provide robust authentication, task management, and performance analysis capabilities for both event hosts and attendees, while offering flexible options for anonymity, pseudonymity, or named identification based on specific event requirements and user preferences.

SUMMARY

This summary introduces concepts related to a system and method for privacy-preserving event attendance recording without revealing user identities. The concepts are further described in the detailed description. This summary is not intended to identify essential features of the claimed subject matter nor limit its scope.

In an embodiment, a system for privacy-preserving event attendance recording is disclosed. The system comprises a memory and a processor coupled to the memory, wherein the processor is configured to execute instructions stored in the memory for registering each user, from a set of users by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, storing the Public-Key (P1) as a base identifier of the user, in a people registry. Further, the processor is configured to execute instructions stored in the memory for registering a set of Attendee-Users, from the set of users, for an event, wherein each Attendee-User from the set of Attendee-Users is registered by, authenticating the Attendee-User based on a user authentication process and the base identifier of the Attendee-User, wherein the user authentication process comprises steps of receiving a biometric sample captured from the Attendee-User in real-time, processing the biometric sample to generate a Secret-Key (S2), fetching the Public-Key (P1) corresponding to the Attendee-User from the user device based on the base identifier, computing a Real-Time-Unique-Number (N2) using the Public-Key (P1), the Secret-Key (S2) and the Function (F1), and authenticating the Attendee-User based on comparison of the Real-Time-Unique-Number (N2) with the Unique-Number (N1) stored on the user device, and providing a Registration-Interface for the set of Attendee-Users to register for the event as a Supervisor-User or a Participant-User, after successful authentication. Furthermore, the processor is configured to execute instructions stored in the memory for recording attendance of one or more Attendee-Users from the set of Attendee-Users by, authenticating each of the one or more Attendee-Users based on the user authentication process and the base identifier associated with each of the one or more Attendee-Users, and providing an Attendance-Recording-Interface for the one or more Attendee-Users to record attendance at the event.

In an embodiment, a method for privacy-preserving event attendance recording is disclosed. The method comprises steps for registering each user, from a set of users by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, storing the Public-Key (P1) as a base identifier of the user, in a people registry. Further, the method comprises steps for registering a set of Attendee-Users, from the set of users, for an event, wherein each Attendee-User from the set of Attendee-Users is registered by, authenticating the Attendee-User based on a user authentication process and the base identifier of the Attendee-User, wherein the user authentication process comprises steps of receiving a biometric sample captured from the Attendee-User in real-time, processing the biometric sample to generate a Secret-Key (S2), fetching the Public-Key (P1) corresponding to the Attendee-User from the user device based on the base identifier, computing a Real-Time-Unique-Number (N2) using the Public-Key (P1), the Secret-Key (S2) and the Function (F1), and authenticating the Attendee-User based on comparison of the Real-Time-Unique-Number (N2) with the Unique-Number (N1) stored on the user device, and providing a Registration-Interface for the set of Attendee-Users to register for the event as a Supervisor-User or a Participant-User, after successful authentication. Furthermore, the method comprises steps for recording attendance of one or more Attendee-Users from the set of Attendee-Users by, authenticating each of the one or more Attendee-Users based on the user authentication process and the base identifier associated with each of the one or more Attendee-Users, and providing an Attendance-Recording-Interface for the one or more Attendee-Users to record attendance at the event.

In an embodiment, a computer program product for privacy-preserving event attendance recording is disclosed. The computer program product comprises a non-transitory computer-readable storage medium having program instructions embodied therewith. The program instructions executable by one or more processors to cause the one or more processors for registering each user, from a set of users by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, storing the Public-Key (P1) as a base identifier of the user, in a people registry. The program instructions executable by one or more processors to cause the one or more processors for registering a set of Attendee-Users, from the set of users, for an event, wherein each Attendee-User from the set of Attendee-Users is registered by, authenticating the Attendee-User based on a user authentication process and the base identifier of the Attendee-User, wherein the user authentication process comprises steps of receiving a biometric sample captured from the Attendee-User in real-time, processing the biometric sample to generate a Secret-Key (S2), fetching the Public-Key (P1) corresponding to the Attendee-User from the user device based on the base identifier, computing a Real-Time-Unique-Number (N2) using the Public-Key (P1), the Secret-Key (S2) and the Function (F1), and authenticating the Attendee-User based on comparison of the Real-Time-Unique-Number (N2) with the Unique-Number (N1) stored on the user device, and providing a Registration-Interface for the set of Attendee-Users to register for the event as a Supervisor-User or a Participant-User, after successful authentication. Furthermore, the program instructions executable by one or more processors to cause the one or more processors for recording attendance of one or more Attendee-Users from the set of Attendee-Users by, authenticating each of the one or more Attendee-Users based on the user authentication process and the base identifier associated with each of the one or more Attendee-Users, and providing an Attendance-Recording-Interface for the one or more Attendee-Users to record attendance at the event.

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments." "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
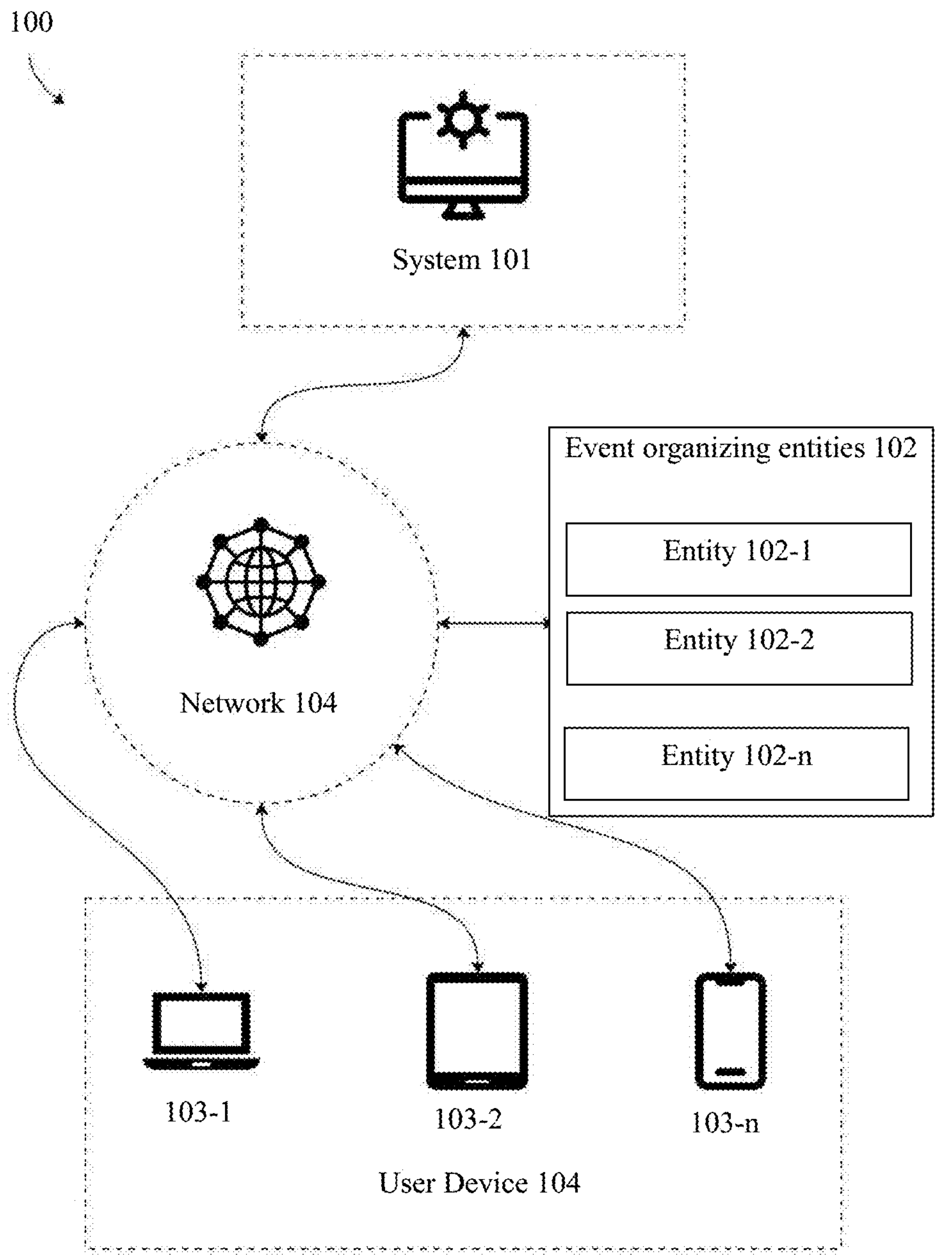
FIG. 1 illustrates a network implementation 100 of a system 101 for privacy-preserving event attendance recording, in accordance with an embodiment of the present disclosure.

Referring to FIG. 1, implementation 100 of system 101 for privacy-preserving event attendance recording is illustrated, in accordance with an embodiment of the present subject matter. In one embodiment, the system 101 may comprise a processor and a memory. Further, the system 101 may be connected to user devices and event organizing entities through a network 104. It may be understood that the system 101 may be communicatively coupled with multiple users through one or more user devices 103-1, 103-2, 103-3 . . . , **103-*n* and event organizing entities 102-1, 102-2, 102-3 . . . , 102-*n* collectively referred to as a user device 103 and event organizing entity 102. The event organizing entity 102** may organize one or more events in an online or offline mode.

In one embodiment, the network 104 may be a cellular communication network used by user devices 103 such as mobile phones, tablets, or a virtual device. In one embodiment, the cellular communication network may be the Internet. The user device 103 may be any electronic device, communication device, image capturing device, machine, software, automated computer program, a robot or a combination thereof. Further the event organizing entity 102 may be any networking platform, media platform, messaging platform, ecommerce platform, or any other application platform. The system 101 may be configured to register users as well as event organizers over the system 101. Further, the system 101 may be configured to authenticate the user, each time the user makes a request to access the system 101.

In one embodiment, the user devices 103 may support communication over one or more types of networks in accordance with the described embodiments. For example, some user devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. The aforementioned user devices 103 and network 104 may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others.

In one embodiment, the user devices 103 are enabled with biometric scanning capabilities. Furthermore, the user devices 103 are also enabled to maintain a people registry. The user devices 103 are also configured for storing the Unique-Number and Public-Key used in the authentication process. The people registry may be an autonomous free public utility that stores the public-key of every registered person. The people registry is an autonomous free public utility that stores the Public-Key of every registered person, which serves as their base identifier.

In one embodiment, the event organizing entity 102 may be a networking platform, an ecommerce platform, or any other internet-based software application which requires user authentication before providing the user with access to the event hosted by the event organizing entity 102. The system 101 supports two types of users namely Supervisor-Users and Participant-Users, both of which can register and participate in events. The system 101 is configured to register users and event organizing entities, authenticate users, record event attendance, manage task assignments, and conduct performance analyses, all while preserving user privacy. The system 101 is designed to maintain user privacy throughout the event management process, allowing users to participate in events and complete tasks without revealing their identity to the event organizing entities. The system 101 also supports performance analysis for both the Supervisor-Users and the Participant-Users, while maintaining user privacy through anonymous, pseudonymous, or named reporting options. The process of user and entity registration are further illustrated with the block diagram in FIG. 2.

Figure 2:
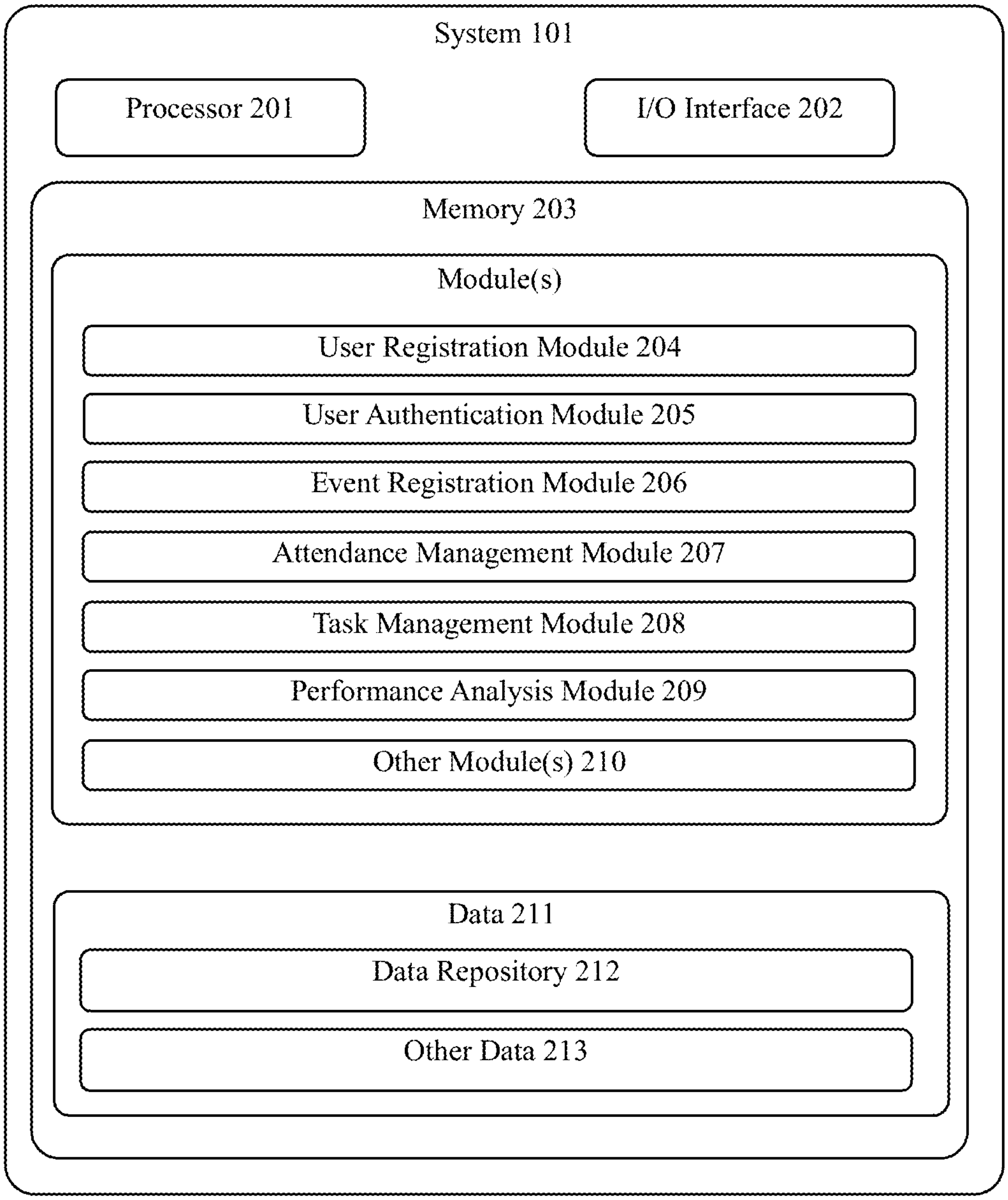
FIG. 2 illustrates components of the system 101 for privacy-preserving event attendance recording, in accordance with an embodiment of the present disclosure.

Referring now to FIG. 2, various components of the system 101 are illustrated, in accordance with an embodiment of the present subject matter. As shown, the system 101 may include at least one processor 201 and a memory 203. The memory consists of a set of modules. The set of modules may include a user registration module 204, a user authentication module 205, and an event registration module 206, an Attendance Management Module 207, Task Management Module 208, a Performance Analysis Module 209 and Other module(s) 210. In one embodiment, the at least one processor 201 is configured to fetch and execute computer-readable instructions, stored in the memory 203, corresponding to each module.

In one embodiment, the memory 203 may include any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and memory cards.

In one embodiment, the programmed instructions may include routines, programs, objects, components, data structures, etc., which perform particular tasks, functions, or implement particular abstract data types. The data 211 may comprise a data repository 212, and other data 213. The other data 213 amongst other things, serves as a repository for storing data processed, received, and generated by one or more components and programmed instructions. The working of the system 101 will now be described in detail referring to FIGS. 1 and 2.

In one embodiment, the User Registration Module 204 is responsible for registering each user from a set of users. The User Registration Module 204 begins by receiving a set of biometric samples from the user, corresponding to one or more biometric factors such as face, voice, retina, fingerprint, palm vein and the like. These samples are then processed to compute a Secret-Key (S1) unique to the user. For example, if a user provides a face scan, the User Registration Module 204 may extract unique characteristics like distance between eyes, the shape of the nose, and the contours of the face to generate the Secret-Key (S1).

Further, the User Registration Module 204 generates a Unique-Number (N1) using a random number generation algorithm. The User Registration Module 204 then applies a Function (F1) to the Secret-Key (S1) and the Unique-Number (N1) to compute a Public-Key (P1). This function is based on Asymmetric Key Encryption, which uses one key for encryption and another for decryption. In this case, the Function (F1) consumes the Secret-Key (S1) and the Unique-Number (N1) to compute the Public-Key (P1), ensuring that the Public-Key (P1) is distinct from the Secret-Key (S1).

In an embodiment, the Function (F1) may implement Asymmetric Key Encryption using elliptic curve cryptography (ECC). Specifically, Function (F1) may use the Secret-Key (S1) as the private key input and combine it with the Unique-Number (N1) through point multiplication on the selected elliptic curve. The Secret-Key (S1) acts as the scalar multiplier while the Unique-Number (N1) is used to derive the base point on the curve. This multiplication results in a point on the curve that becomes the Public-Key (P1). The one-way nature of ECC ensures that even with knowledge of P1 and N1, it remains computationally infeasible to derive S1, thereby maintaining the security of the biometric-derived secret key while enabling reliable authentication through the derived public key.

Finally, the Unique-Number (N1) is stored on the user's device and in the data repository 212, while the Public-Key (P1) is stored as the user's base identifier in a people registry. This approach ensures that the user's identity remains protected, as the Secret-Key (S1) is never stored and can only be regenerated through the user's biometric input.

In an embodiment, the User Authentication Module 205 is designed to authenticate users based on their base identifier and a robust authentication process. When a user attempts to access the system 101, the user is prompted to provide a real-time biometric sample. This sample is processed to generate a new Secret-Key (S2). The User Authentication Module 205 then fetches the Public-Key (P1) corresponding to the user from their device, using the base identifier. Using the Public-Key (P1), the newly generated Secret-Key (S2), and the same Function (F1) used in registration, the User Authentication Module 205 computes a Real-Time-Unique-Number (N2). This number is then compared with the Unique-Number (N1) stored on the user's device. If they match, it confirms that the current user is the same person who registered, thereby authenticating them. This process ensures secure authentication without storing any biometric data, maintaining user privacy.

In an embodiment, once a user is authenticated, the Event Registration Module 206 comes into play. The Event Registration Module 206 allows a set of Attendee-Users, from the set of users, for specific events. The Event Registration Module 206 first authenticates the Attendee-Users through the user authentication module 205 as stated above, ensuring that only verified Attendee-Users can register for events. After successful authentication, the Event Registration Module 206 provides a Registration-Interface where the Attendee-Users can choose to register as either a Supervisor-User or a Participant-User for the event. For instance, in a conference setting, speakers or organizers might register as Supervisor-Users, while attendees would register as Participant-Users. This distinction is crucial for the subsequent modules that handle task assignment and performance analysis.

In an embodiment, the Attendance Management Module 207 is responsible for recording the attendance of registered Attendee-Users at the event. The Attendance Management Module 207 begins by authenticating each Attendee-User who attempts to mark their attendance, using the same robust process employed by the user authentication module

205. This ensures that only legitimate, Attendee-Users can mark their attendance. Once authenticated, the Attendance Management Module 207 provides different interfaces for attendance recording based on the Attendee-User's role. Supervisor-Users are presented with a Host-Sign-In-Interface, where they can record their presence and potentially initialize the event. Participant-Users are provided with an Participant-Sign-In-Interface to mark their attendance. These differentiated interfaces allow for role-specific attendance tracking, which can be useful for event management and subsequent performance analysis.

In an embodiment, the Task Management Module 208 facilitates the assignment, acceptance, and verification of tasks within an event. The Task Management Module 208 provides Supervisor-Users with a Task-Assignment-Interface, allowing the Supervisor-Users to assign specific tasks to Participant-Users. For example, in a workshop, a supervisor might assign participants to different group activities or presentations. Once tasks are assigned, the Task Management Module 208 offers a Task-Acceptance-Interface for Participant-Users. Here, the Participant-Users can view their assigned tasks and formally accept them, creating a clear record of task allocation. As tasks are completed, Supervisor-Users can use the Task-Certification-Interface to verify and certify the completion of tasks by participants. The Task Management Module 208 also includes a completion certificate interface, where Participant-Users can receive formal acknowledgment of their task completion. This feature could be particularly useful in training or educational events where participants need proof of completion. Additionally, there's a Host-Assessment-Interface where Participant-Users can provide feedback on how well Supervisor-Users performed their assigned tasks, ensuring accountability on both sides.

In an embodiment, the Performance Analysis Module 209 is designed to capture, analyze, and report on the performance of both supervisor and Participant-Users. It provides Supervisor-Users with a Performance-Capturing-Interface, where they can record detailed assessments of each Participant-User's performance on assigned tasks. This data is then compiled into comprehensive assessment data for each participant. The Performance Analysis Module 209 uses this data to generate individual attendee performance reports, offering insights into each participant's engagement and achievement during the event. These reports are made available through a Performance-Report-Interface, accessible to authorized users for viewing and management.

The Performance Analysis Module 209 is capable of performing both individualized and aggregated analyses of performance for both supervisor and Participant-Users. This allows for detailed individual feedback as well as broader trend analysis across the event. Importantly, all assessment records are maintained with tokenized identities of both supervisor and Participant-Users, ensuring privacy while still allowing for meaningful analysis.

The system 101 also includes two separate interfaces for handling user information. The first interface allows users to set Non-Personally-Identifiable-Preference-Information, such as interests or professional skills. This data is stored in a network-accessible data repository 212. The second interface is for Personally-Identifiable-Information, which is stored only on the user's device in an encrypted format, inaccessible to the network. This dual approach ensures that users can receive personalized experiences without compromising their privacy.

Throughout all these processes, the system 101 is designed to maintain user privacy. The system 101 offers flexible options for anonymity, pseudonymity, or named identification based on the specific requirements of each event and user preferences. This ensures that the system 101 can be used for a wide range of events, from those requiring strict anonymity to those where identified participation is necessary.

Figure 3:
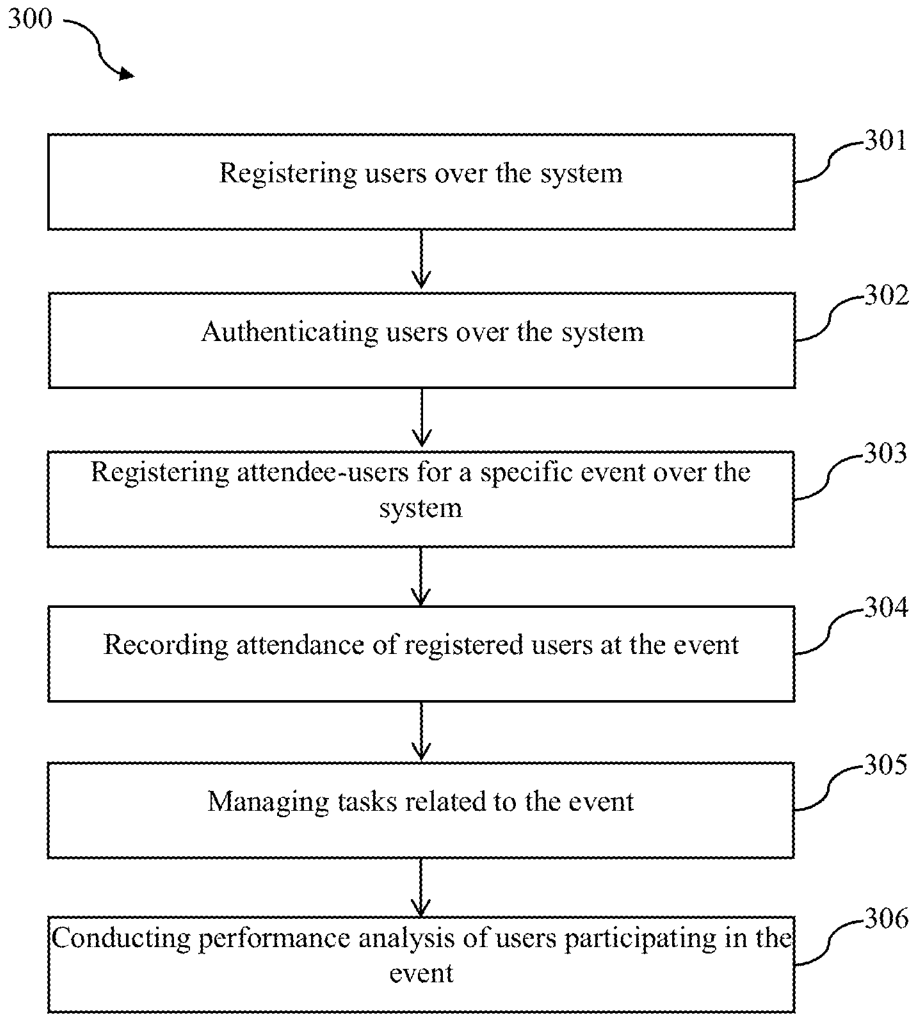
FIG. 3 illustrates a method 300 for privacy-preserving event attendance recording, in accordance with an embodiment of the present disclosure.

Now referring to FIG. 3, a method 300 for privacy-preserving event attendance recording is illustrated, in accordance with an embodiment of the present subject matter.

At step 301, the processor 201 may be configured for registering users over the system 101. The detailed steps for registering users over the system 101 are further elaborated with reference to FIG. 4.

At step 302, the processor 201 may be configured for authenticating users over the system 101. The detailed steps for authenticating users over the system 101 are further elaborated with reference to FIG. 5.

At step 303, the processor 201 may be configured for a set of Attendee-Users, from the set of users, for a specific event over the system 101. The detailed steps for event registration are further elaborated with reference to FIG. 6.

At step 304, the processor 201 may be configured for recording attendance of the set of Attendee-Users at the event. The steps for recording attendance using the system 101 are further illustrated in FIG. 7.

At step 305, the processor 201 may be configured for managing tasks related to the event. The steps for task management using the system 101 are further illustrated in FIG. 8.

At step 306, the processor 201 may be configured for conducting performance analysis of Attendee-Users participating in the event. The steps for performance analysis using the system 101 are further illustrated in FIG. 9.

Figure 4:
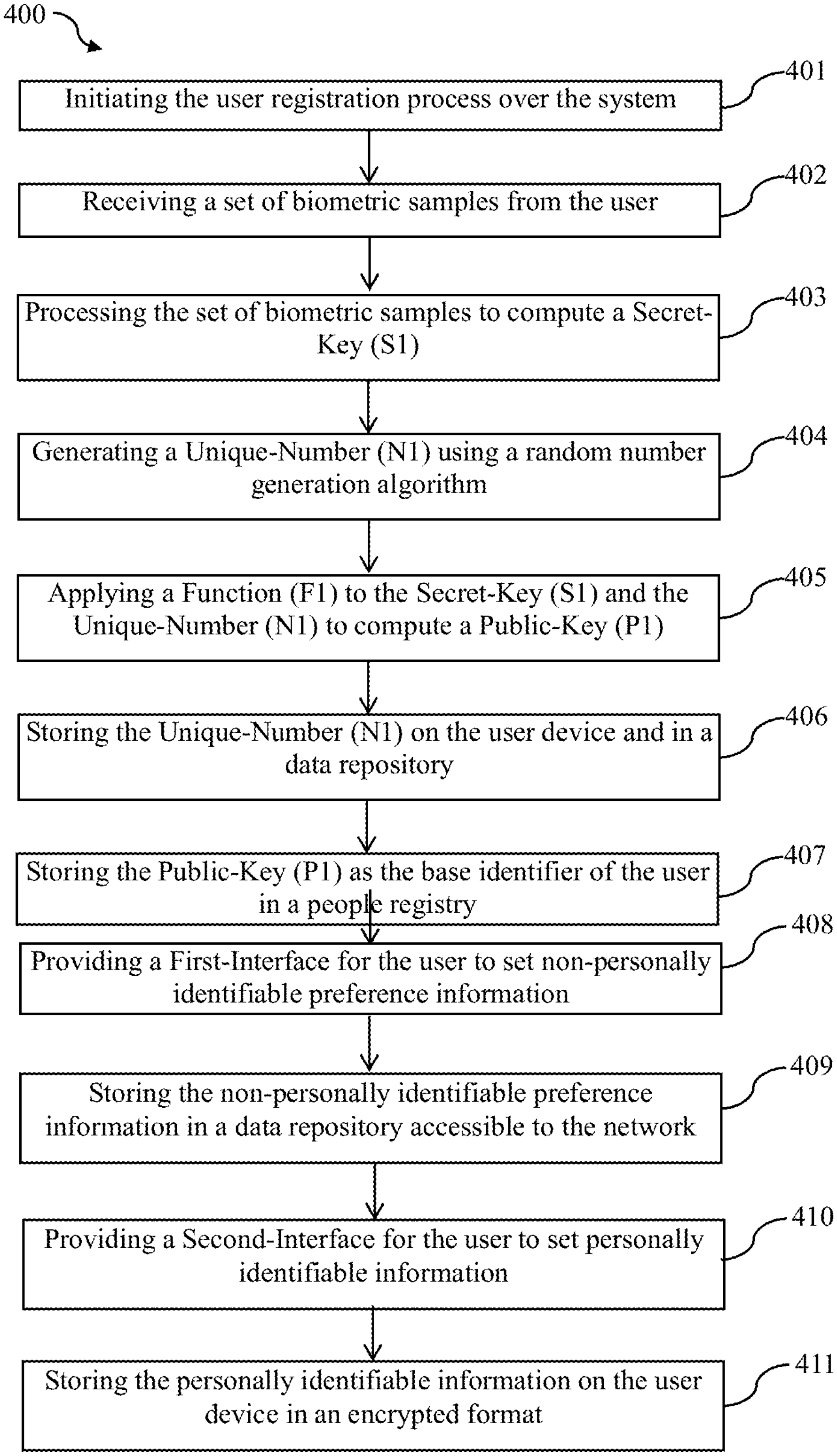
FIG. 4 illustrates a method 400 for user registration, in accordance with an embodiment of the present disclosure.

Now referring to FIG. 4, a method 400 for user registration is illustrated, in accordance with an embodiment of the present subject matter.

At step 401, the processor 201 may be configured for initiating the user registration process over the system 101. The step 401 involves receiving a registration request from a user via the user device 103.

At step 402, the processor 201 may be configured to receive a set of biometric samples from the user, corresponding to one or more biometric factors. These biometric factors may include, but are not limited to, face, voice, retina, fingerprint, and palm vein. The biometric samples are captured by the user device 103 and sent to the system 101 for processing. The use of multiple biometric factors enhances the security and reliability of the subsequent authentication process.

At step 403, the processor 201 may be configured to process the set of biometric samples to compute a Secret-Key (S1) corresponding to the user. Step 403 involves extracting unique characteristics from the biometric samples that can be consistently reproduced each time the user provides the user's biometrics. The Secret-Key (S1) is a crucial element in the system's privacy-preserving architecture, as the Secret-Key (S1) is never stored but regenerated from biometrics when needed.

At step 404, the processor 201 may be configured to generate a Unique-Number (N1) using a random number generation algorithm. The Unique-Number (N1) serves as an additional security measure and is generated only once for each user. The Unique-Number (N1) adds an extra layer of protection to the user's identity within the system 101.

At step 405, the processor 201 may be configured to apply a Function (F1) to the Secret-Key (S1) and the Unique- Number (N1) to compute a Public-Key (P1). The Function (F1) is based on Asymmetric Key Encryption, which consumes the Secret-Key (S1) and the Unique-Number (N1) to produce a Public-Key (P1) that is distinct from the Secret-Key (S1). This step ensures that the Public-Key (P1) can be safely stored and used for identification without compromising the user's biometric information.

At step 406, the processor 201 may be configured to store the Unique-Number (N1) on the user device 103 and in a data repository 212 within the system 101. The dual storage of the Unique-Number (N1) facilitates secure authentication processes.

At step 407, the processor 201 may be configured to store the Public-Key (P1) as the base identifier of the user in a people registry. This registry may be implemented as a distributed hash-table, with user devices 103 potentially serving as peers in this distributed system. The use of a distributed registry enhances the system's resilience and privacy features.

At step 408, the processor 201 may be configured to provide a first interface for the user to set Non-Personally-Identifiable-Preference-Information. This non-Personally-Identifiable-Information may include general interests, event preferences, and professional skills. The separation of non-Personally-Identifiable-Information from Personally-Identifiable-Information is a key privacy feature of the system.

At step 409, the processor 201 may be configured to store the Non-Personally-Identifiable-Preference-Information in the data repository 212 accessible to the network. This allows for personalized experiences without compromising user privacy.

At step 410, the processor 201 may be configured to provide a second interface for the user to set Personally-Identifiable-Information. This Personally-Identifiable-Information may include data such as name, address, phone number, and email address.

At step 411, the processor 201 may be configured to store the Personally-Identifiable-Information on the user device 103 in an encrypted format. This Personally-Identifiable-Information is inaccessible to the network and can only be accessed and decrypted locally on the user device 103. This step ensures that sensitive personal information remains under the user's control at all times. This registration process ensures that the user's identity is securely established within the system while maintaining a high level of privacy. The Secret-Key (S1) is never stored, the Unique-Number (N1) and Public-Key (P1) are used for authentication, and personal information is kept separate and secure. This method allows for anonymous or pseudonymous participation in events while still enabling secure authentication and personalized experiences. The process aligns with the system's goal of providing privacy-preserving event attendance recording and management.

Figure 5:
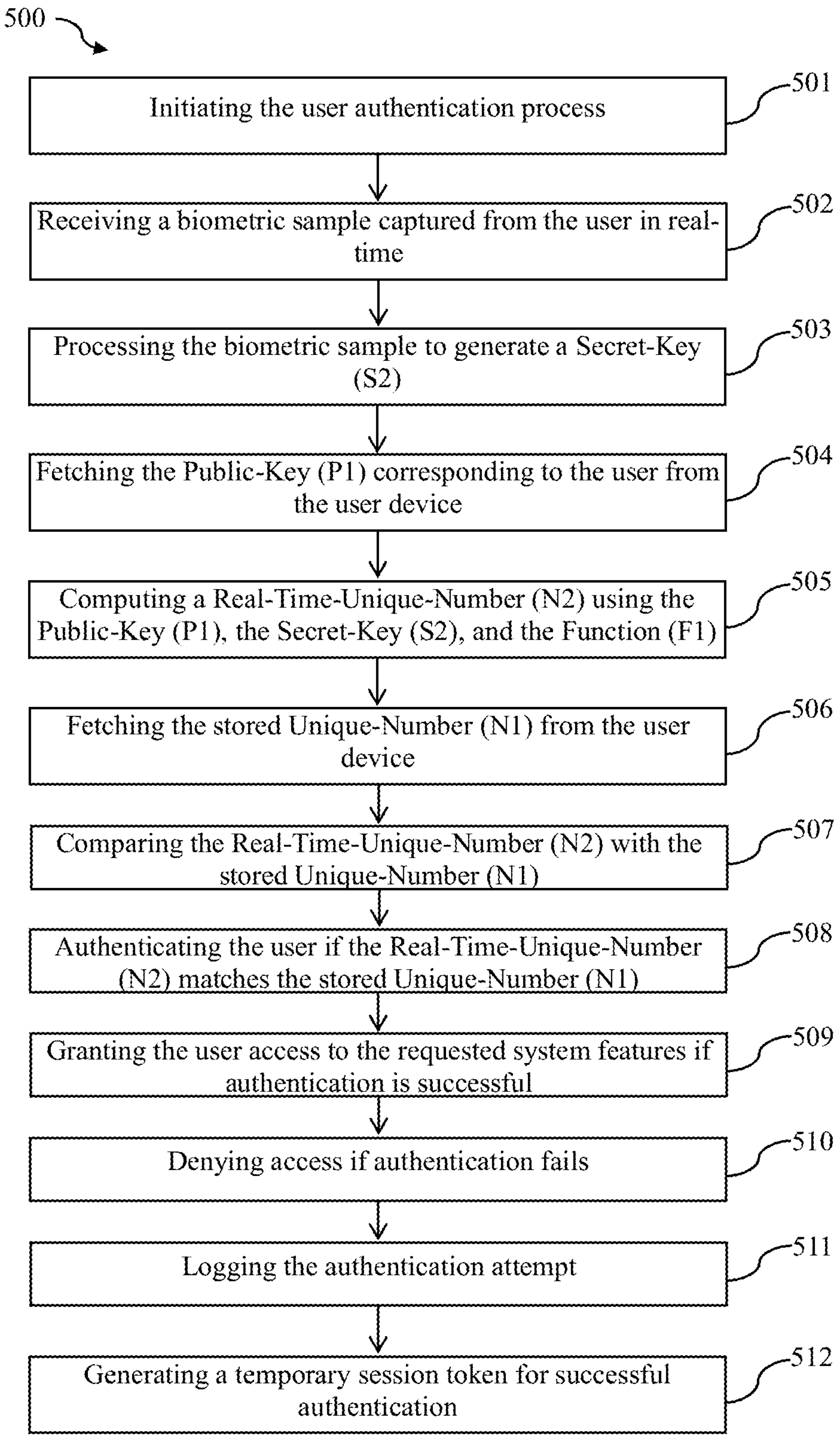
FIG. 5 illustrates a method 500 for user authentication, in accordance with an embodiment of the present disclosure.

Now referring to FIG. 5, a method 500 for user authentication is illustrated, in accordance with an embodiment of the present subject matter.

At step 501, the processor 201 may be configured to initiate the user authentication process when a user attempts to access the system 101 or perform an action requiring authentication. This step is triggered by user actions such as logging into the system, registering for an event, or accessing restricted features.

At step 502, the processor 201 may be configured to receive a biometric sample captured from the user in real-time. This biometric sample corresponds to the same type of biometric factor(s) used during the registration process (e.g., fingerprint, face, voice, retina, or palm vein). The user device 103 captures this biometric sample and securely transmits the biometric sample to the system 101 for processing.

At step 503, the processor 201 may be configured to process the biometric sample to generate a Secret-Key (S2). Step 503 involves extracting the unique characteristics from the provided biometric sample, employing algorithms similar to those used during the registration process. The Secret-Key (S2) is generated in real-time and is not stored, maintaining the privacy and security of the user's biometric data.

At step 504, the processor 201 may be configured to fetch the Public-Key (P1) corresponding to the user from the user device 103. The Public-Key (P1) serves as the base identifier for the user in the system. The Public-Key (P1) is retrieved from the user device 103 to ensure that the authentication process is tied to the specific device associated with the user account.

At step 505, the processor 201 may be configured to compute a Real-Time-Unique-Number (N2) using the Public-Key (P1), the Secret-Key (S2), and the Function (F1). The Function (F1) is the same Asymmetric Key Encryption function used during the registration process. This step combines the freshly generated Secret-Key (S2) with the stored Public-Key (P1) to create a unique identifier for this authentication attempt.

At step 506, the processor 201 may be configured to fetch the stored Unique-Number (N1) from the user device 103. The Unique-Number (N1) was generated during the registration process and serves as a reference point for authentication.

At step 507, the processor 201 may be configured to compare the Real-Time-Unique-Number (N2) with the stored Unique-Number (N1). This comparison is the crux of the authentication process, determining whether the current biometric input matches the registered user's identity.

At step 508, the processor 201 may be configured to authenticate the user if the Real-Time-Unique-Number (N2) matches the stored Unique-Number (N1). If the numbers match, the system confirms that the current user is the same person who registered, thereby authenticating the user. This step ensures that only the legitimate user can access the account, even if someone else possesses the user's device.

At step 509, if the authentication is successful, the processor 201 may be configured to grant the user access to the requested system features or allow the user to perform the action that required authentication. This may include logging into the system, accessing event Registration-Interfaces, or viewing personalized content.

At step 510, if the authentication fails (i.e., N2 does not match N1), the processor 201 may be configured to deny access and potentially prompt the user to try again or contact support. The system may implement security measures such as limiting the number of retry attempts to prevent brute-force attacks.

At step 511, the processor 201 may be configured to log the authentication attempt, recording the time, date, and result (success or failure) without storing any biometric data or Personally-Identifiable-Information. This log helps in maintaining system security and can be used for auditing purposes while preserving user privacy.

At step 512, in case of successful authentication, the processor 201 may be configured to generate a temporary session token that allows the user to perform multiple actions without re-authenticating for a limited time period. This token is securely stored and managed to balance user convenience with system security. This authentication process ensures secure access to the system 101 without storing any biometric data. The method relies on the real-time generation of a Secret-Key from the user's biometrics and the comparison of a computed Unique-Number with a stored one. By never storing the actual biometric data or the Secret-Key, the system maintains a high level of user privacy while providing robust security. This approach aligns with the system's goal of enabling privacy-preserving event attendance and management.

Figure 6:
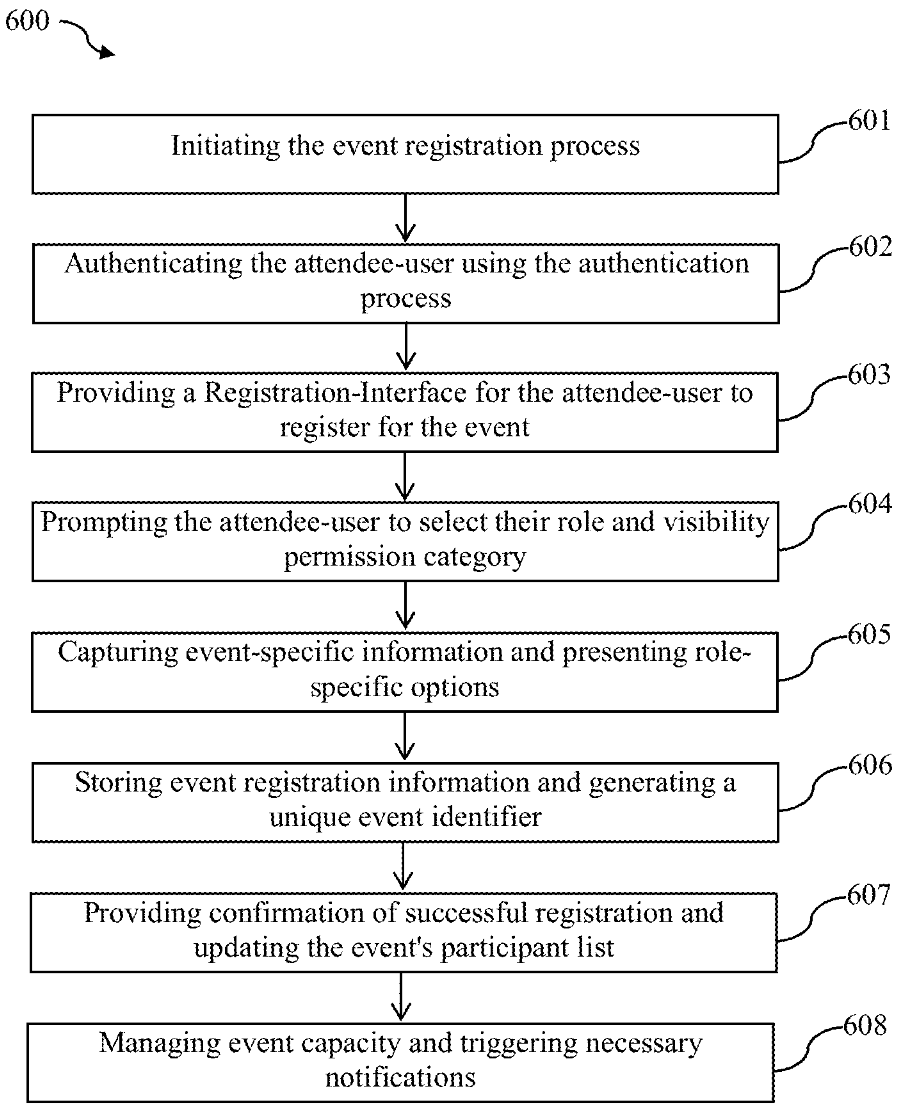
FIG. 6 illustrates a method 600 for registering a set of users for an event, in accordance with an embodiment of the present disclosure.

Now referring to FIG. 6, a method 600 for event registration is illustrated, in accordance with an embodiment of the present subject matter.

At step 601, the processor 201 may be configured to initiate the event registration process when a set of Attendee-Users requests to register for a specific event. This initiation occurs when an Attendee-User selects an event from a list of available events or follows a direct registration link. The system prepares to collect and process the necessary information for event registration while ensuring privacy protection.

At step 602, the processor 201 may be configured to authenticate the Attendee-User using the authentication process described in FIG. 5. This step involves biometric verification without storing any biometric data. The system generates a Secret-Key (S2) from the user's biometric input, retrieves the user's Public-Key (P1), computes a Real-Time-Unique-Number (N2), and compares it with the stored Unique-Number (N1) to verify the user's identity. This process ensures that only verified users can register for events while maintaining the highest level of privacy and security.

At step 603, if the authentication is successful, the processor 201 may be configured to provide a Registration-Interface for the Attendee-User to register for the event. This interface is designed to be user-friendly while adhering to the privacy-preserving principles of the system. It presents only the necessary fields for event registration, minimizing the collection of personal data.

At step 604, the processor 201 may be configured to prompt the Attendee-User to select their role for the event (supervisor or participant) and assign a visibility permission category (anonymous, pseudonymous, or public-key visible) based on the event's requirements and the user's preferences. The system provides clear explanations of each role and visibility category, ensuring users make informed choices. This step is crucial for subsequent task assignment, performance analysis, and privacy protection throughout the event.

At step 605, the processor 201 may be configured to capture any event-specific information required from the Attendee-User and present role-specific options and information. For Supervisor-Users, this may include access to task creation and assignment features. For Participant-Users, it may include details about the event schedule or pre-event preparations. The system ensures that only necessary information is collected, adhering to data minimization principles.

At step 606, the processor 201 may be configured to store the event registration information, including the user's role and visibility permission category, in the data repository 212, and generate a unique event identifier for the user. The event registration information is stored securely, with Personally-Identifiable-Information kept separate and encrypted. The unique event identifier is designed to allow necessary event functions without revealing the user's identity, supporting the system's privacy-preserving goals.

At step 607, the processor 201 may be configured to provide confirmation of successful registration to the user and update the event's participant list, respecting each user's visibility permission category. The confirmation includes necessary event details and the unique event identifier, sent securely without containing sensitive information. The participant list is updated according to user preferences. For example, for anonymous users, only aggregate numbers are updated. For pseudonymous users, their chosen pseudonyms are added and for public-key visible users, their public keys are added.

At step 608, the processor 201 may be configured to manage event capacity, if applicable, and trigger necessary notifications to event organizers about new registrations, adhering to the privacy settings chosen by the registrants. If the event has a limited capacity, the system checks if the maximum number of registrants has been reached and updates the event's availability status accordingly. Notifications to event organizers are designed to provide necessary information while respecting the privacy settings of each registrant.

This event registration process ensures that users can securely sign up for events while maintaining their desired level of privacy. By authenticating users before registration, allowing them to choose their role and visibility level, and carefully managing the collection and storage of event-related information, the system provides a flexible and secure method for event participation. The process accommodates the different requirements for supervisor and Participant-Users, setting the stage for effective task management and performance analysis during and after the event, all while upholding the privacy-preserving principles central to the system's design.

Figure 7:
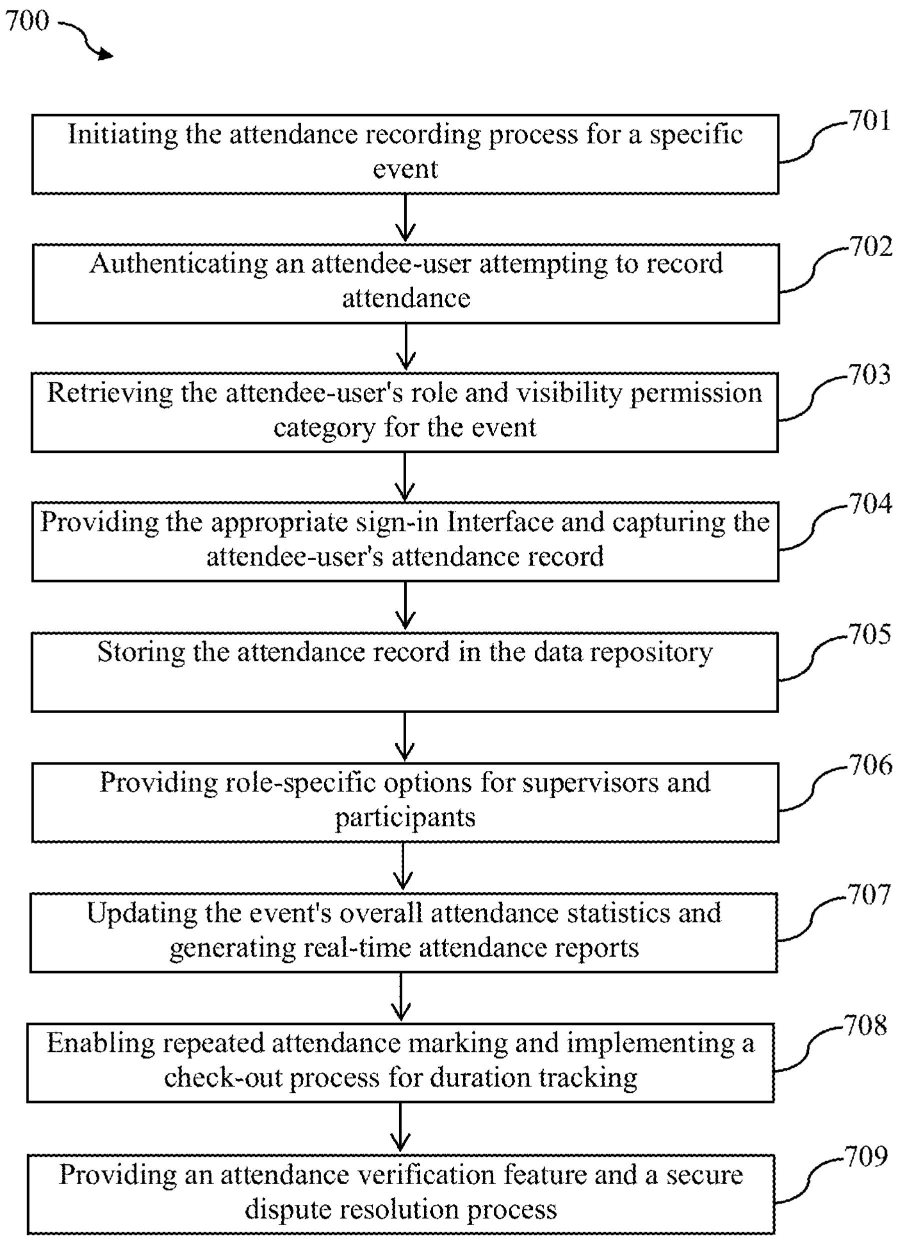
FIG. 7 illustrates a method 700 for recording attendance of one or more registered users at an event, without having the user reveal their identity, in accordance with an embodiment of the present disclosure.

Now referring to FIG. 7, a method 700 for recording attendance of Attendee-Users at an event is illustrated, in accordance with an embodiment of the present subject matter.

At step 701, the processor 201 may be configured to initiate the attendance recording process for a specific event. This initiation may be triggered automatically at the event's scheduled start time or manually by an authorized event organizer. The system ensures that all necessary event data and user registration information is accessible for the attendance recording process.

At step 702, the processor 201 may be configured to authenticate an Attendee-User who is attempting to record attendance, following the method described in FIG. 5. This authentication process involves capturing a biometric sample from the Attendee-User in real-time, processing it to generate a Secret-Key (S2), fetching the user's Public-Key (P1), computing a Real-Time-Unique-Number (N2), and comparing it with the stored Unique-Number (N1). This method ensures secure authentication without storing any biometric data, thus preserving user privacy.

At step 703, if the authentication is successful, the processor 201 may be configured to retrieve the Attendee-User's role (supervisor or participant) and visibility permission category (anonymous, pseudonymous, or public-key visible) for the event. This information is fetched from the secure event registration data stored during the registration process. The visibility permission category determines how the Attendee-User's attendance information will be recorded and displayed in reports.

At step 704, based on the Attendee-User's role, the processor 201 may be configured to provide the appropriate sign-in interface and capture the user's attendance record. For Supervisor-Users, a Host-Sign-In-Interface is presented, offering additional event management options. For Participant-Users, an Participant-Sign-In-Interface is presented, focused on simple attendance marking. The attendance record includes the timestamp and any additional relevant information such as the specific session attended or the duration of attendance. For multi-session events, the system may record which particular sessions the user attended.

At step 705, the processor 201 may be configured to store the attendance record in the data repository 212, associating it with the Attendee-User's unique event identifier while respecting the visibility permission category. For anonymous users, the attendance is recorded without any identifiable information. For pseudonymous users, the chosen pseudonym is used. For public-key visible users, the public key is associated with the attendance record. This approach ensures that attendance is accurately tracked while maintaining the privacy preferences of each user.

At step 706, the processor 201 may be configured to provide role-specific options. For Supervisor-Users, this includes options to initialize or manage event activities, such as starting a session, marking the beginning of task assignments, or accessing real-time attendance data. For Participant-Users, the system provides information about upcoming tasks or sessions the participant is registered for, enhancing the user experience by offering personalized event information upon sign-in.

At step 707, the processor 201 may be configured to update the event's overall attendance statistics and generate real-time attendance reports, maintaining user privacy by aggregating data according to visibility permission categories. The system might show total attendees and breakdowns by role without revealing individual identities. These reports are designed to respect the visibility permission categories of attendees, showing anonymized attendance trends, pseudonymous participation lists, or identified attendees based on individual privacy settings.

At step 708, for events requiring continuous or multiple attendance recordings (e.g., for different sessions within a conference), the processor 201 may be configured to enable repeated attendance marking and implement a check-out process for duration tracking. The repeated marking uses the same secure process for each check-in and check-out, allowing for detailed tracking of participation across multiple sessions or days while maintaining consistent privacy protection.

At step 709, the processor 201 may be configured to provide an attendance verification feature for participants and a secure dispute resolution process for addressing any discrepancies in attendance records. The verification feature allows users to view and confirm their own attendance records without accessing other attendees' information. The dispute resolution process enables users to contest attendance records if needed, all while maintaining the privacy-preserving nature of the system.

This consolidated attendance recording process ensures accurate tracking of event participation while maintaining user privacy. By using the secure authentication method and respecting visibility permission categories, the system allows for detailed attendance records without compromising user identities. The differentiation between supervisor and participant interfaces supports efficient event management and participation tracking, all while upholding the privacy-preserving principles central to the system's design.

Figure 8:
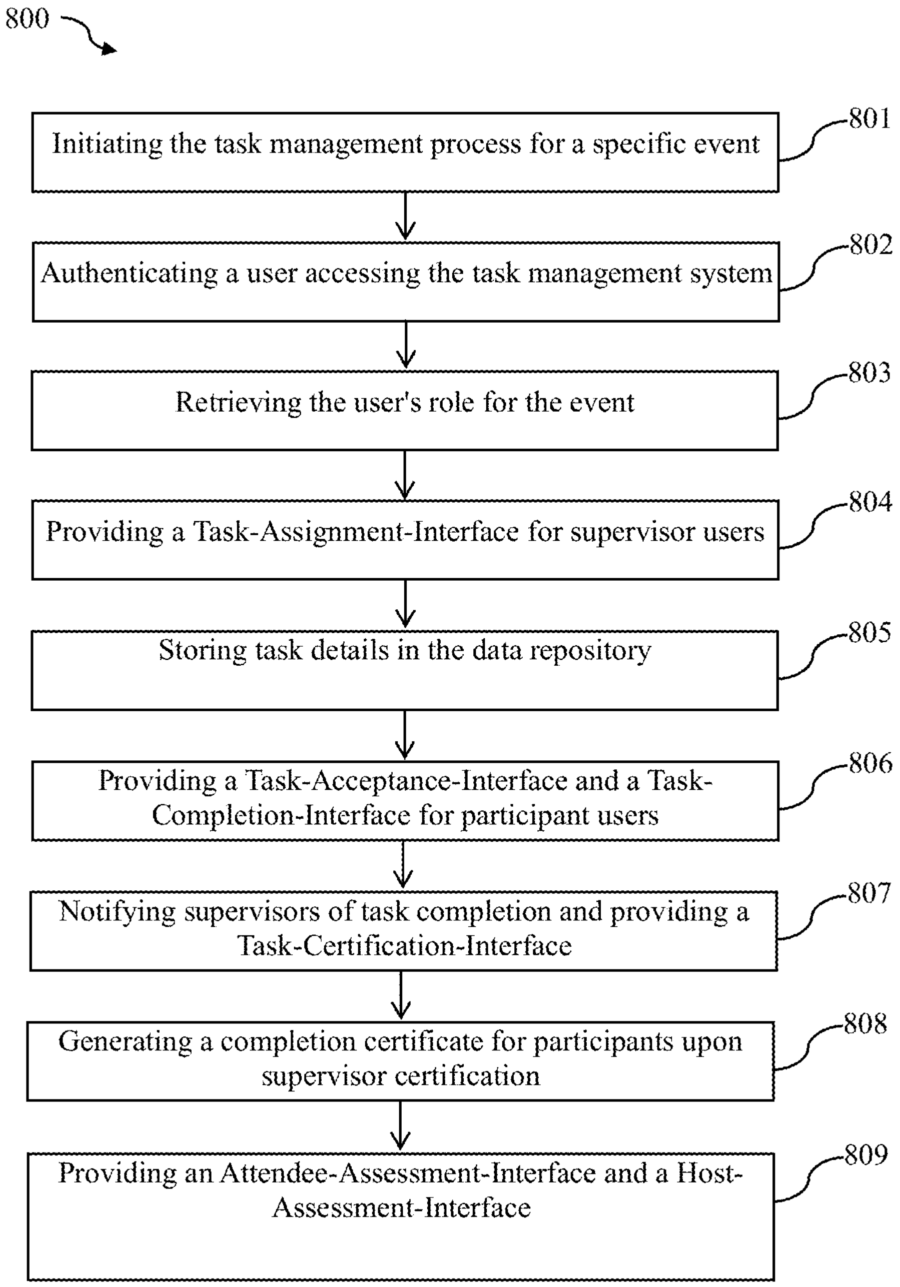
FIG. 8 illustrates a method 800 for managing tasks related to an event, in accordance with an embodiment of the present disclosure.

Now referring to FIG. 8, a method 800 for managing tasks related to an event is illustrated, in accordance with an embodiment of the present subject matter.

At step 801, the processor 201 may be configured to initiate the task management process for a specific event. This initiation may occur at the start of the event or at predetermined intervals during the event's duration. The system ensures that all necessary event data is accessible and that the task management module is properly initialized for the specific event context.

At step 802, the processor 201 may be configured to authenticate a user accessing the task management system, following the method described in FIG. 5. This authentication process involves biometric verification without storing any biometric data, preserving user privacy. The system verifies the user's identity while maintaining the anonymity or pseudonymity preferences set during event registration.

At step 803, if the authentication is successful, the processor 201 may be configured to retrieve the user's role (supervisor or participant) for the event from the secure event registration data. The role information is fetched using the user's unique identifier, ensuring that appropriate access rights and interfaces are provided without exposing personal information.

At step 804, for Supervisor-Users, the processor 201 may be configured to provide a Task-Assignment-Interface. This interface allows supervisors to create tasks, set deadlines, and assign tasks to Participant-Users. The interface may include features such as task templates and prioritization tools, all designed to facilitate efficient task management while respecting participant privacy settings.

At step 805, when a supervisor creates and assigns a task, the processor 201 may be configured to store the task details in the data repository 212, associating it with the assigned participant's unique event identifier. This approach maintains privacy by avoiding direct links to personal information while ensuring tasks are correctly associated with participants.

At step 806, for Participant-Users, the processor 201 may be configured to provide a task acceptance and completion interface. This interface displays assigned tasks, allows participants to accept tasks, and enables them to mark tasks as completed. The interface is designed to show only relevant information to each participant, maintaining the privacy of other users' task assignments and progress.

At step 807, the processor 201 may be configured to notify the relevant supervisor when a participant marks a task as completed and provide a Task-Certification-Interface for supervisors to verify and certify the completion of tasks. This notification and certification process respects privacy settings, providing necessary information without revealing unnecessary personal details of participants.

At step 808, upon a supervisor's certification of task completion, the processor 201 may be configured to generate a completion certificate for the participant, adhering to the participant's chosen visibility level. This certificate serves as proof of task completion while respecting the privacy preferences set by the participant during event registration. The Completion-Certification-Interface generates verifiable digital certificates upon task completion. Each certificate incorporates a unique identifier, comprehensive event details including name, date and type, specific task information and completion status, along with time-stamped verification signatures from Supervisor-Users. The system uses the participant's Public-Key as a privacy-preserving identifier within the certificate. All certificates are cryptographically signed using the system's private key and support independent verification through a public verification portal while maintaining participant privacy. The Completion-Certification-Interface enables event organizers to customize certificate templates and supports both digital and printable output formats to accommodate various use cases.

At step 809, the processor 201 may be configured to provide an Attendee-Assessment-Interface and a Host-Assessment-Interface. The Attendee-Assessment-Interface enables the Signed-In Supervisor-Users to record the assessment of Signed-In Participant-Users. The Host-Assessment-Interface enables participants to evaluate the performance of supervisors in managing tasks and the overall event. This interface is designed to be anonymous or pseudonymous based on the participant's preferences, allowing for honest feedback without compromising participant privacy.

This task management process ensures efficient assignment, tracking, and completion of tasks while maintaining the privacy-preserving nature of the system. It supports both supervisor and participant roles, enabling a comprehensive task lifecycle from creation to certification. Throughout the process, the system balances the need for effective task management with the imperative to protect user privacy, adhering to the core principles of the invention.

Figure 9:
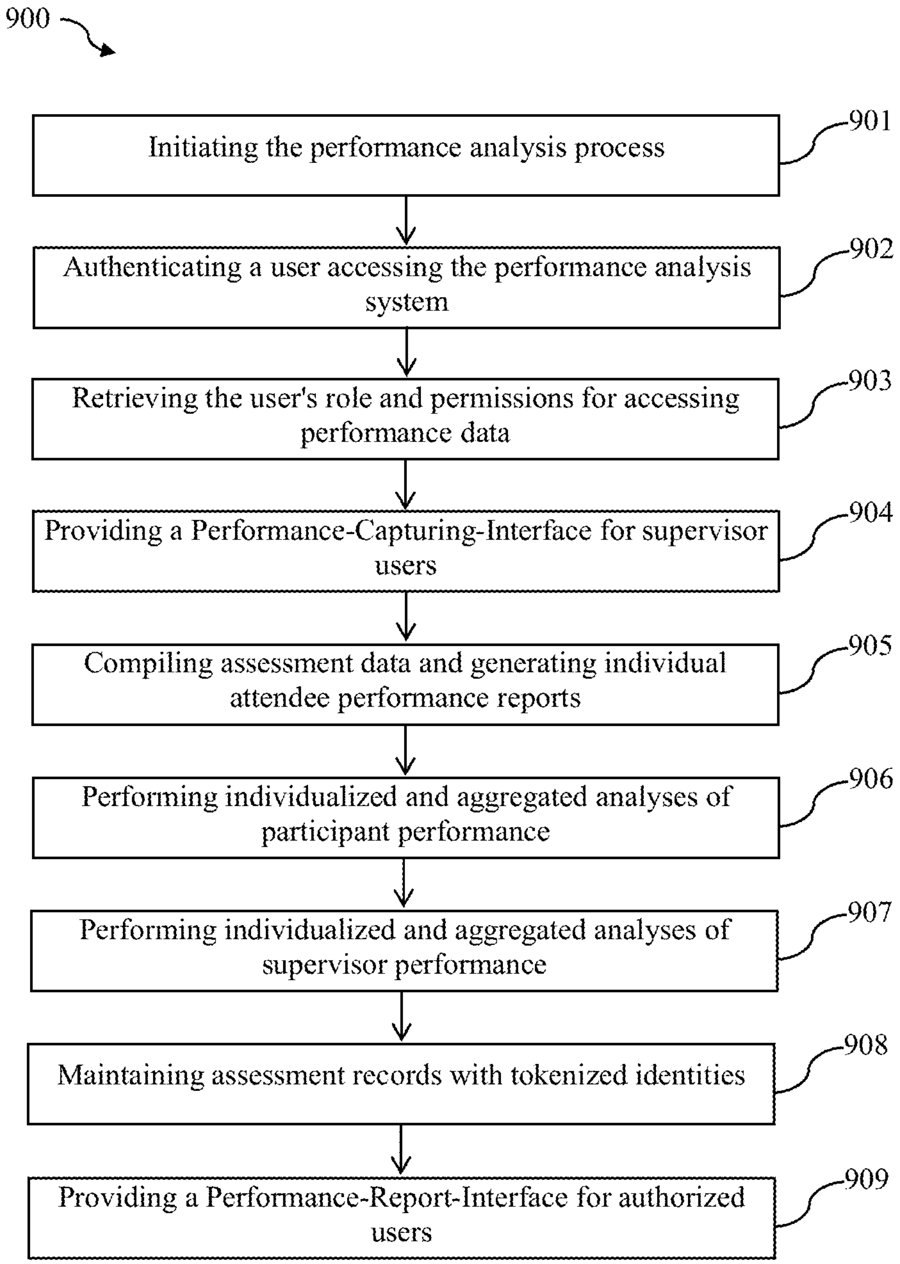
FIG. 9 illustrates a method 900 for conducting performance analysis of users participating in an event, while maintaining user privacy, in accordance with an embodiment of the present disclosure.

Now referring to FIG. 9, a method 900 for conducting performance analysis of users participating in an event is illustrated, in accordance with an embodiment of the present subject matter.

At step 901, the processor 201 may be configured to initiate the performance analysis process after the completion of an event or a significant phase of an event. This initiation may be triggered automatically based on predefined event milestones or manually by an authorized event organizer. The system ensures that all necessary data, including attendance records and task completion information, is available for analysis.

At step 902, the processor 201 may be configured to authenticate an Attendee-User accessing the performance analysis system, following the method described in FIG. 5. This authentication process involves biometric verification without storing biometric data, maintaining the privacy-preserving nature of the system. The authentication ensures that only authorized individuals can access the performance analysis tools.

At step 903, if the authentication is successful, the processor 201 may be configured to retrieve the Attendee-User's role (supervisor, participant, or authorized analyst) and their permissions for accessing performance data. These roles and permissions are based on the Attendee-User's registration information and the event's specific settings. The system applies role-based access control to ensure that users can only access data and perform actions appropriate to their role.

At step 904, for Supervisor-Users, the processor 201 may be configured to provide a Performance-Capturing-Interface. This interface allows supervisors to input detailed assessments of each Participant-User's performance on assigned tasks. The interface may include standardized evaluation criteria and rating scales to ensure consistency in assessments. Supervisors can provide both quantitative ratings and qualitative feedback, all while respecting the privacy settings of participants.

At step 905, the processor 201 may be configured to compile the assessment data corresponding to each Participant-User based on the recorded performance inputs from supervisors and generate individual attendee performance reports. This compilation process aggregates data from multiple supervisors if applicable, calculates overall performance scores, and generates comprehensive reports. The reports are structured to provide meaningful feedback while adhering to the privacy settings of each participant.

At step 906, the processor 201 may be configured to perform individualized and aggregated analyses of participant performance, keeping the identities of participants anonymous, pseudonymous, or named according to their visibility permission categories. Individualized analyses may include performance trends and skill assessments, while aggregated analyses might present overall performance distributions and trends. The system ensures that all analyses respect the chosen visibility levels of participants.

At step 907, the processor 201 may be configured to perform individualized and aggregated analyses of supervisor performance based on participant feedback and task management metrics. This may include assessments of task clarity, fairness in evaluations, and effectiveness in providing guidance. The system maintains the privacy of both supervisors and participants during this analysis.

The system implements comprehensive performance metrics encompassing task completion rates, timeliness, quality assessments based on predefined rubrics, participation levels across event activities, and peer feedback scores. For aggregated analyses, the system employs sophisticated statistical methods to normalize scores across different events, ensuring meaningful comparisons while protecting individual privacy. The analysis framework incorporates differential privacy techniques for small sample sizes and implements k-anonymity principles for demographic breakdowns, providing stakeholders with confidence intervals for aggregated metrics without compromising individual privacy.

The performance analysis system maintains privacy through multiple sophisticated mechanisms. It systematically removes identifying patterns in individual performance data while retaining analytical value. The system enforces minimum threshold requirements for group analyses to prevent individual identification, implements controlled noise addition in aggregate statistics to protect privacy, and provides users with granular control over their analytics participation while maintaining essential metrics. This comprehensive approach ensures meaningful performance insights while robustly protecting participant privacy.

At step 908, the processor 201 may be configured to maintain all assessment records with tokenized identities of both Supervisor-Users and Participant-Users to ensure privacy. This tokenization process replaces actual identifiers with unique tokens, allowing for data analysis without exposing personal information. The system maintains a secure mapping of tokens to identities, accessible only under strictly controlled conditions.

At step 909, the processor 201 may be configured to provide a Performance-Report-Interface for authorized users to view and manage the generated performance reports, applying privacy filters based on the visibility permission categories of users. This interface allows users to access reports appropriate to their role and permissions. Privacy filters ensure that information is presented according to each user's chosen visibility level, which may involve anonymization, use of pseudonyms, or full identification as appropriate.

Access to performance reports through this interface is controlled by two key factors: the user's authentication level, which is determined during the authentication process and may be periodically re-validated, and their assigned role in the system (Supervisor-User or Participant-User). The combination of these factors determines the scope and depth of report access, ensuring appropriate data visibility while maintaining privacy controls.

This performance analysis process enables comprehensive evaluation of both participant and supervisor performance while maintaining the privacy-preserving principles of the system. It allows for detailed individual and aggregated analyses, with flexible options for anonymity, pseudonymity, or named reporting based on user preferences and event requirements. Throughout the process, the system balances the need for meaningful performance assessment with the imperative to protect user privacy, adhering to the core principles of the invention.

Although implementations for the system 101 and the method 300 for privacy-preserving event attendance recording, have been described in language specific to structural features and methods, it must be understood that the claims are not limited to the specific features or methods described. Rather, the specific features and methods are disclosed as examples of implementations for the system 101 and the method 300 for privacy-preserving event attendance recording.

The invention claimed is:

1. A system for privacy-preserving event attendance recording, comprising:

a memory; and a processor coupled to the memory, wherein the processor is configured to execute instructions stored in the memory for:

registering each user, from a set of users by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, storing the Public-Key (P1) as a base identifier of the user, in a people registry;

registering a set of Attendee-Users, from the set of users, for an event, wherein each Attendee-User from the set of Attendee-Users is registered by, authenticating the Attendee-User based on a user authentication process and the base identifier of the Attendee-User, wherein the user authentication process comprises steps of receiving a biometric sample captured from the Attendee-User in real-time, processing the biometric sample to generate a Secret-Key (S2), fetching the Public-Key (P1) corresponding to the Attendee-User from a user device of the Attendee-User based on the base identifier of the Attendee-User, computing a Real-Time-Unique-Number (N2) using the Public-Key (P1), the Secret-Key (S2) and the Function (F1), and authenticating the Attendee-User based on comparison of the Real-Time-Unique-Number (N2) with the Unique-Number (N1) stored on the user device, and providing a Registration-Interface for the set of Attendee-Users to register for the event as a Supervisor-User or a Participant-User, after successful authentication; and recording attendance of one or more Attendee-Users from the set of Attendee-Users by, authenticating each of the one or more Attendee-Users based on the user authentication process and the base identifier associated with each of the one or more Attendee-Users, and providing an Attendance-Recording-Interface for the one or more Attendee-Users to record attendance at the event.

2. The system of claim 1 is further configured for assigning tasks by, provisioning the Supervisor-Users with a Task-Assignment-Interface to assign the Participant-Users one or more tasks related to the event;

conducting a performance analysis by, provisioning the Supervisor-Users with a Performance-Capturing-Interface to record performance of each Participant-User based on the one or more tasks assigned to each Participant-User, compiling assessment data corresponding to each Participant-User based on the recorded performance; and generating individual Attendee-User performance reports based on the assessment data corresponding to each Participant-User, and providing a Performance-Report-Interface for viewing and managing the generated performance reports.

3. The system of claim 1, wherein registering each user further comprises:

providing a first interface for registered users to set Non-Personally-Identifiable-Preference-Information, wherein the Non-Personally-Identifiable-Preference-Information includes data that cannot be used to identify a specific individual, such as general interests, event preferences, and professional skills;

storing the Non-Personally-Identifiable-Preference-Information in a data repository accessible to a network;

providing a second interface for registered users to set Personally-Identifiable-Information, wherein the Personally-Identifiable-Information includes data that can be used to identify a specific individual, such as name, address, phone number, and email address; and storing the Personally-Identifiable-Information on the user device in an encrypted format, wherein the Personally-Identifiable-Information is inaccessible to the network and can only be decrypted and accessed locally on the user device.

4. The system of claim 1, wherein recording attendance further comprises:

providing a Host-Sign-In-Interface for registered Supervisor-Users to sign in and record their presence at the event using their Public-Key (P1); and providing a Participant-Sign-In-Interface for registered Participant-Users to sign in and record their presence at the event using their Public-Key (P1).

5. The system of claim 1, wherein assigning tasks further comprises:

providing a Task-Acceptance-Interface for the Signed-In Participant-Users to record their acceptance of tasks assigned by Signed-In Supervisor-Users;

providing a Task-Certification-Interface for the Signed-In Supervisor-Users to certify completion of tasks by Signed-In Participant-Users;

providing a Completion-Certification-Interface for Signed-In Participant-Users to receive a task completion certificate; and providing a Host-Assessment-Interface for Signed-In Participant-Users to certify that the Supervisor-Users have complied with the event rules.

6. The system of claim 1, wherein the step of the performance analysis further comprises:

providing an Attendee-Assessment-Interface for Signed-In Supervisor-Users to record the assessment of Signed-In Participant-Users;

providing a Host-Assessment-Interface for Signed-In Participant-Users to record their assessment of Signed-In Supervisor-Users; and maintaining assessment records with tokenized identities of the Supervisor-Users and the Participant-Users.

7. The system of claim 1, wherein the performance analysis further comprises:

performing individualized analyses of the performance of the Supervisor-Users based on the assessment data provided by the Participant-Users;

performing aggregated analyses of the performance of the Supervisor-Users based on the assessment data provided by the Participant-Users;

performing individualized analyses of the performance of the Participant-Users based on the assessment data provided by the Supervisor-Users; and performing aggregated analyses of the performance of the Participant-Users based on the assessment data provided by the Supervisor-Users.

8. The system of claim 1, further comprising:

providing an interface for viewing and managing generated performance reports, wherein access to the performance reports is restricted based on the user's authentication level and role in the system.

9. A method for privacy-preserving event attendance recording, the method comprising steps of:

registering each user, from a set of users by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, storing the Public-Key (P1) as a base identifier of the user, in a people registry;

registering a set of Attendee-Users, from the set of users, for an event, wherein each Attendee-User from the set of Attendee-Users is registered by, authenticating the Attendee-User based on a user authentication process and the base identifier of the Attendee-User, wherein the user authentication process comprises steps of receiving a biometric sample captured from the Attendee-User in real-time, processing the biometric sample to generate a Secret-Key (S2), fetching the Public-Key (P1) corresponding to the Attendee-User from a user device of the Attendee-User based on the base identifier of the Attendee-User, computing a Real-Time-Unique-Number (N2) using the Public-Key (P1), the Secret-Key (S2) and the Function (F1), and authenticating the Attendee-User based on comparison of the Real-Time-Unique-Number (N2) with the Unique-Number (N1) stored on the user device, and providing a Registration-Interface for the set of Attendee-Users to register for the event as a Supervisor-User or a Participant-User, after successful authentication; and recording attendance of one or more Attendee-Users from the set of Attendee-Users by, authenticating each of the one or more Attendee-Users based on the user authentication process and the base identifier associated with each of the one or more Attendee-Users, and providing an Attendance-Recording-Interface for the one or more Attendee-Users to record attendance at the event.

10. The method of claim 9 is further comprising steps of assigning tasks by, provisioning the Supervisor-Users with a Task-Assignment-Interface to assign the Participant-Users one or more tasks related to the event;

conducting a performance analysis by, provisioning the Supervisor-Users with a Performance-Capturing-Interface to record performance of each Participant-User based on the one or more tasks assigned to each Participant-User, compiling assessment data corresponding to each Participant-User based on the recorded performance; and generating individual Attendee-User performance reports based on the assessment data corresponding to each Participant-User, and providing a Performance-Report-Interface for viewing and managing the generated performance reports.

11. The method of claim 9, wherein registering each user further comprises:

providing a first interface for registered users to set Non-Personally-Identifiable-Preference-Information, wherein the Non-Personally-Identifiable-Preference-Information includes data that cannot be used to identify a specific individual, such as general interests, event preferences, and professional skills;

storing the Non-Personally-Identifiable-Preference-Information in a data repository accessible to a network;

providing a second interface for registered users to set Personally-Identifiable-Information, wherein the Personally-Identifiable-Information includes data that can be used to identify a specific individual, such as name, address, phone number, and email address; and storing the Personally-Identifiable-Information on the user device in an encrypted format, wherein the Personally-Identifiable-Information is inaccessible to the network and can only be accessed and decrypted locally on the user device.

12. The method of claim 9, wherein recording attendance further comprises:

providing a Host-Sign-In-Interface for registered Supervisor-Users to sign in and record their presence at the event using their Public-Key (P1); and providing a Participant-Sign-In-Interface for registered Participant-Users to sign in and record their presence at the event using their Public-Key (P1).

13. The method of claim 9, wherein assigning tasks further comprises:

providing a Task-Acceptance-Interface for the Signed-In Participant-Users to record their acceptance of tasks assigned by Signed-In Supervisor-Users;

providing a Task-Certification-Interface for the Signed-In Supervisor-Users to certify completion of tasks by Signed-In Participant-Users;

providing a Completion-Certification-Interface for Signed-In Participant-Users to receive a task completion certificate; and providing a Host-Assessment-Interface for Signed-In Participant-Users to certify that the Supervisor-Users have complied with the event rules.

14. The method of claim 9, wherein the step of the performance analysis further comprises:

providing an Attendee-Assessment-Interface for Signed-In Supervisor-Users to record the assessment of Signed-In Participant-Users;

providing a Host-Assessment-Interface for Signed-In Participant-Users to record their assessment of the Signed-In Supervisor-Users; and maintaining assessment records with tokenized identities of the Supervisor-Users and the Participant-Users.

15. The method of claim 9, wherein the performance analysis further comprises:

performing individualized analyses of the performance of the Supervisor-Users based on the assessment data provided by the Participant-Users;

performing aggregated analyses of the performance of the Supervisor-Users based on the assessment data provided by the Participant-Users;

performing individualized analyses of the performance of the Participant-Users based on the assessment data provided by the Supervisor-Users; and performing aggregated analysis of the performance of the Participant-Users based on the assessment data provided by the Supervisor-Users.

16. The method of claim 9 is further comprising steps of:

providing an interface for viewing and managing generated performance reports, wherein access to the performance reports is restricted based on the user's authentication level and role in the system.

17. A computer program product for privacy-preserving event attendance recording, the computer program product comprising a non-transitory computer-readable storage medium having program instructions embodied therewith, the program instructions executable by one or more processors to cause the one or more processors for:

registering each user, from a set of users by, receiving a set of biometric samples of the user, corresponding to one or more biometric factors, processing the set of biometric samples to compute a Secret-Key (S1) corresponding to the user, generating a Unique-Number (N1) using a random number generation algorithm, applying a Function (F1) to the Secret-Key (S1) and the Unique-Number (N1) to compute a Public-Key (P1), wherein the Function (F1) is based on Asymmetric Key Encryption and consumes the Secret-Key (S1) and the Unique-Number (N1) to compute the Public-Key (P1), wherein the Public-Key (P1) is distinct from the Secret-Key (S1), storing the Unique-Number (N1) on a user device and in a data repository, storing the Public-Key (P1) as a base identifier of the user, in a people registry;

registering a set of Attendee-Users, from the set of users, for an event, wherein each Attendee-User from the set of Attendee-Users is registered by, authenticating the Attendee-User based on a user authentication process and the base identifier of the Attendee-User, wherein the user authentication process comprises steps of receiving a biometric sample captured from the Attendee-User in real-time, processing the biometric sample to generate a Secret-Key (S2), fetching the Public-Key (P1) corresponding to the Attendee-User from a user device of the Attendee-User based on the base identifier of the Attendee-User, computing a Real-Time-Unique-Number (N2) using the Public-Key (P1), the Secret-Key (S2) and the Function (F1), and authenticating the Attendee-User based on comparison of the Real-Time-Unique-Number (N2) with the Unique-Number (N1) stored on the user device, and providing a Registration-Interface for the set of Attendee-Users to register for the event as a Supervisor-User or a Participant-User, after successful authentication; and recording attendance of one or more Attendee-Users from the set of Attendee-Users by, authenticating each of the one or more Attendee-Users based on the user authentication process and the base identifier associated with each of the one or more Attendee-Users, and providing an Attendance-Recording-Interface for the one or more Attendee-Users to record attendance at the event.

* * * * *